(12) United States Patent
Songhurst et al.

(10) Patent No.: US 7,907,519 B2
(45) Date of Patent: Mar. 15, 2011

(54) PACKET FORWARDING

(75) Inventors: David J Songhurst, Felixstowe (GB); Arnaud Jacquet, Ipswich (GB); Peter Hovell, Woodbridge (GB)

(73) Assignee: British Telecommunications plc, London (GB)

( * ) Notice: Subject to any disclaimer, the term of this patent is extended or adjusted under 35 U.S.C. 154(b) by 424 days.

(21) Appl. No.: 11/794,337

(22) PCT Filed: Jan. 18, 2006

(86) PCT No.: PCT/GB2006/000163
§ 371 (c)(1),
(2), (4) Date: Jun. 28, 2007

(87) PCT Pub. No.: WO2006/079783
PCT Pub. Date: Aug. 3, 2006

(65) Prior Publication Data
US 2008/0159129 A1 Jul. 3, 2008

(30) Foreign Application Priority Data

Jan. 28, 2005 (GB) .................................. 0501841.1
Jul. 18, 2005 (GB) .................................. 0514691.5

(51) Int. Cl.
*G01R 31/08* (2006.01)
(52) U.S. Cl. .................. 370/229; 370/232; 370/230
(58) Field of Classification Search .................. None
See application file for complete search history.

(56) References Cited

U.S. PATENT DOCUMENTS

| 5,751,969 | A | | 5/1998 | Kapoor | |
|---|---|---|---|---|---|
| 6,144,636 | A | * | 11/2000 | Aimoto et al. | 370/229 |
| 6,657,962 | B1 | | 12/2003 | Barri et al. | |
| 7,284,047 | B2 | | 10/2007 | Barham | |
| 2004/0136379 | A1 | * | 7/2004 | Liao et al. | 370/395.21 |
| 2005/0041587 | A1 | * | 2/2005 | Lee | 370/236 |

FOREIGN PATENT DOCUMENTS

| EP | 1317151 | 6/2003 |
|---|---|---|
| GB | 2281005 | 2/1995 |
| WO | WO 03/010909 A1 | 2/2003 |
| WO | WO 03010909 A1 * | 2/2003 |

OTHER PUBLICATIONS

Wang et al, "A Random Early Demotion and Promotion Marker for Assured Services" Michigan State university, {wangfugu, prasant}@cse.msu.edu, Apr. 13, 2000.*

(Continued)

*Primary Examiner* — Chi H Pham
*Assistant Examiner* — Kouroush Mohebbi
(74) *Attorney, Agent, or Firm* — Nixon & Vanderhye PC (57) ABSTRACT

Packet forwarding apparatus has an input for receiving packets; a packet classifier arranged in operation to read a class indication in received packets and in dependence thereon to pass packets to a class-based policer associated with the class indicated; a plurality of class-based policers, each operable to assign a provisional indication to packets of the associated class in response to a measure of the load presented by packets of the class exceeding a predetermined class-based threshold; a multi-class policer operable to receive provisionally-indicated packets processed by the class-based policers, and to assign a congestion indication to packets having the provisional indication in response to congestion arising at the packet forwarding apparatus; and an output for presenting packets processed by the multi-class policer for onward transmission from the apparatus.

19 Claims, 6 Drawing Sheets

Token bucket counters for n equal priority traffic classes

OTHER PUBLICATIONS

International Search Report for PCT/GB2006/000163 mailed Mar. 27, 2006.

Heinanen et al., "A Two Rate Three Color Marker; rfc2698.txt," IETF Standard, Internet Engineering Task Force, Switzerland, Sep. 1999, XP015008481.

Wang et al., "A Random Early Demotion and Promotion Marker for Assured Services," IEEE Journal of Selected Areas in Communications, vol. 18, No. 12, Dec. 2005, pp. 2640-2650, XP009063635.

Blake et al., "An Architecture for Differentiated Services; rfc2475. txt," IETF Standard, Internet Engineering Task Force, Switzerland, Dec. 1998, XP015008259.

Floyd et al., "Random Early Detection Gateways for Congestion Avoidance," IEEE/ACM Transactions on Networking, vol. 1, No. 4, Aug. 1, 1993, pp. 397-413, XP000415363.

Karsten et al., "Admission Control based on Packet Marking and Feedback Signalling—Mechanisms, Implementation and Experiments," Multimedia Communications, May 2002, XP002247632.

Nahm et al., "Enhanced Service Differentiation for Layered Video Multicast in Differentiated Service Networks," Visual Communications and Image Processing, vol. 4671, 2002, pp. 46-57, XP009063153.

International Search Report mailed Mar. 27, 2006 in International Application No. PCT/GB2006/000163.

UK Search Report dated Jun. 8, 2005 in Application No. GB 0501841.1.

Henderson et al., "Congestion Pricing. Paying Your Way in Communication Networks," IEEE Internet Computing, Sep./Oct. 2001, pp. 85-89.

Gibbens et al., "A Decision-Theoretic Approach to Call Admission Control in ATM Networks," IEEE Journal on Selected Areas in Communications, vol. 13, No. 6, Aug. 1995, pp. 1101-1114.

Bianchi et al., "Endpoint Admission Control with Delay Variation Measurements for QoS in IP Networks," ACM SIGCOMM Computer Communications Review, vol. 32, No. 2, Apr. 2002, pp. 61-69.

Heinanen et al. "A Two Rate Three Color Marker," Network Working Group, RFC 2698, Sep. 1999, pp. 1-5.

Floyd et al., "Random Early Detection Gateways for Congestion Avoidance," IEEE/ACM Transactions on Networking, vol. 1, No. 4, Aug. 1993, pp. 397-413.

Karsten et al., "Admission Control Based on Packet Marking and Feedback Signalling—Mechanisms, Implementation and Experiments," Darmstadt University of Technology, KOM Technical Report TUD-KOM 2002-03, May 2002, pp. 1-17.

Nahm et al., "Enhanced Service Differentiation for Layered Video Multicast in Differentiated Service Networks," Visual Communications and Image Processing, vol. 4671, 11 pages.

Gibbens et al., "Distributed Connection Acceptance Control for a Connectionless Network," 16 International Teletraffic Congress in Edinburgh, Jun. 1999, 12 pages.

Wang et al., "A Random Early Demotion and Promotion Marker for Assured Services," IEEE Journal of Selected Areas in Communications, vol. 18, No. 12, Dec. 2005, pp. 1-23.

M3I, EU Vth Framework Project IST-1999-11429, 5 pages.

Ramakrishnan et al., "The Addition of Explicit Congestion Notification (ECN) to IP," Standards Track, RFC 3168, Sep. 2001, pp. 1-63.

Kunniyur et al., "Analysis and Design of an Adaptive Virtual Queue (AVQ) Algorithm for Active Queue Management," SIGCOMM'01, San Diego, California, Aug. 27-31, 2001, pp. 123-134.

Floyd, "Comments on Measurement-based Admissions Control for Controlled-Load Services," CCR, Technical Report, Jul. 1996, pp. 1-16.

Gibbens et al., "Resource Pricing and the Evolution of Congestion Control," Automatica 35, 1999, pp. 1-35.

Cetinkaya et al., "Egress Admission Control," In Proceedings of IEEE INFOCOM 2000, vol. 3, Mar. 2000, 10 pages.

Jamin et al., "A Measurement-based Admission Control Algorithm for Integrated Services Packet Networks (Extended Version)," Dec. 13, 1995, pp. 1-38.

Blake et al., "An Architecture for Differentiated Services," Network Working Group, RFC 2475, Dec. 1998, pp. 1-36.

A.S. Tanenbaum, "Computer Networks", Third Edition, pp. 379-384. Prentice-Hall (1996).

* cited by examiner

Figure 1: Separation of queue management and virtual queue for early congestion detection with ECN marking Figure 2: A GQS region Figure 3: Token bucket counters for n equal priority traffic classes Figure 4: Token bucket counters for high and low priority traffic classes Figure 5: Comparative QoS behaviour to be achieved through ECN marking Figure 6: Alternative Scenario for a Two-Class System

PACKET FORWARDING

This application is the US national phase of international application PCT/GB2006/000163 filed 18 Jan. 2006 which designated the U.S. and claims benefit of GB 0501841.1, dated 28 Jan. 2005, and GB 0514691.5, dated 18 Jul. 2005, the entire content of each of which is hereby incorporated by reference.

BACKGROUND

1. Technical Field

The present invention relates to apparatus for forwarding packets in a data network, and to associated methods of forwarding packets, and to related manners and apparatus for performing such methods.

2. Related Art

Many different quality-of-service (QoS) mechanisms have been proposed for packet-switched communications networks such as the Internet. The use of Resource Reservation Protocol (RSVP) with IntServ enables explicit reservation of capacity for traffic that requires guaranteed bandwidth with low packet drop probability. By contrast, Differentiated Services (DiffServ) enables relative prioritisation of different 'best-effort' traffic classes, which do not require explicit bandwidth or packet drop guarantees. More recently the development of traffic-engineered multi-protocol label switching (MPLS-TE) has enabled efficient bandwidth management.

Another control mechanism that is relevant to the invention is the use of token buckets and leaky buckets in order to regulate packet flows [1]. In the past these algorithms have been used to smooth packet flows and to police them to ensure specified peak rates.

An alternative approach to providing bandwidth guarantees is the use of measurement-based admission control [2,3,4,5,6,7]. With this type of scheme, routers make measurements of load or congestion across a region of the network. These measurements are used as the basis for admission control decisions by which new demands for guaranteed quality connections are accepted or rejected. The advantage of this approach is that routers within the core region do not need to be aware of individual connections (they have no 'flow-state'), but they might simply apply some form of priority queueing to ensure that packets in guaranteed flows have low delay.

A more radical approach is the use of congestion pricing, for example according to the theory developed by Kelly [8], and studied further in the EU project M3I as a market-based solution to network resource allocation [9]. According to this approach, if end-users are charged in proportion to congestion in the network then they will moderate their demands for bandwidth in accordance with their willingness-to-pay, resulting in a socially optimum allocation of bandwidth. This mechanism also allows end-systems to differentiate between best-effort flows (which will back-off in response to pricing) and flows requiring guaranteed bandwidth (which can accept the pricing and continue sending). A mechanism for signaling congestion already exists—the use of Explicit Congestion Notification (ECN) by which individual packets can be 'marked' by a router which is experiencing (or approaching) congestion [10]. ECN was proposed as an enhancement of TCP (Transmission Control Protocol) rate control, allowing end-systems to adapt their rate in response to congestion marks without the need for packet-drops. The use of ECN marks as a basis for congestion charging is a natural development, as set out below.

Explicit Congestion Notification (ECN) has been proposed for use within Internet Protocol (IP) networks, and involves ECN capable routers marking packets as having experienced congestion by the use of specific ECN fields within the packet header, rather than dropping the packet and leaving a receiver of data to infer congestion, as had previously been the case (as packet loss could also be caused by transmission errors, loss of a packet is not a definitive indicator of network congestion). Within IP, a two-bit field within the IP header has been proposed to enable the marking of packets, comprising a first 'ECN-Capable Transport' (ECT) bit (which was generally intended to be used to indicate whether the end-points of the transport protocol were ECN capable) and a second 'Congestion Experienced' (CE) bit (which was generally intended to be marked by routers in the event of congestion to indicate that the packet has experienced congestion). The use of two bits within the IP header provides four code-points, however, ([ECT,CE]: [0,0], [0,1], [1,0], and [1,1]) and RFC 3168 (reference [10]—see FIG. 1 thereof) defines two of these as being indicative of ECN capability ([0,1] and [1,0], referred to as ECT(1) and ECT(0) respectively), leaving the code-point [0,0] to indicate a lack of ECN capability, and the code-point [1,1] to indicate a 'Congestion Experienced' state. Senders of data are free to use either the ECT(0) or the ECT(1) code-point to indicate ECT, on a packet-by-packet basis. The use of both the two code-points for ECT, ECT(0) and ECT(1), is motivated primarily by the desire to allow mechanisms for the data sender to verify that network elements are not erasing the CE codepoint, and that data receivers are properly reporting to the sender the receipt of packets with the CE codepoint set, as required by the transport protocol.

Regarding uses of the ECN marks, it has been proposed that they can be used for both congestion signaling purposes and for congestion pricing. In particular, Henderson et al [14] suggest that since the mark indicates network congestion, the network can aggregate marks to represent a "shadow price" for a flow, reflecting the cost of the congestion which it causes. A problem of using ECN marks to generate the shadow price is that it is not until the packets of a flow have arrived at the receiver that the number of packets in the flow with the CE code-point set can be properly measured, since at any point on the route before this further packets may have the CE code-point set at any router later in the route. There is therefore a problem of generating the level of shadow charges for use on an inter-domain basis between network domains without having knowledge of the total shadow charge which will ultimately arise.

Figure 1:
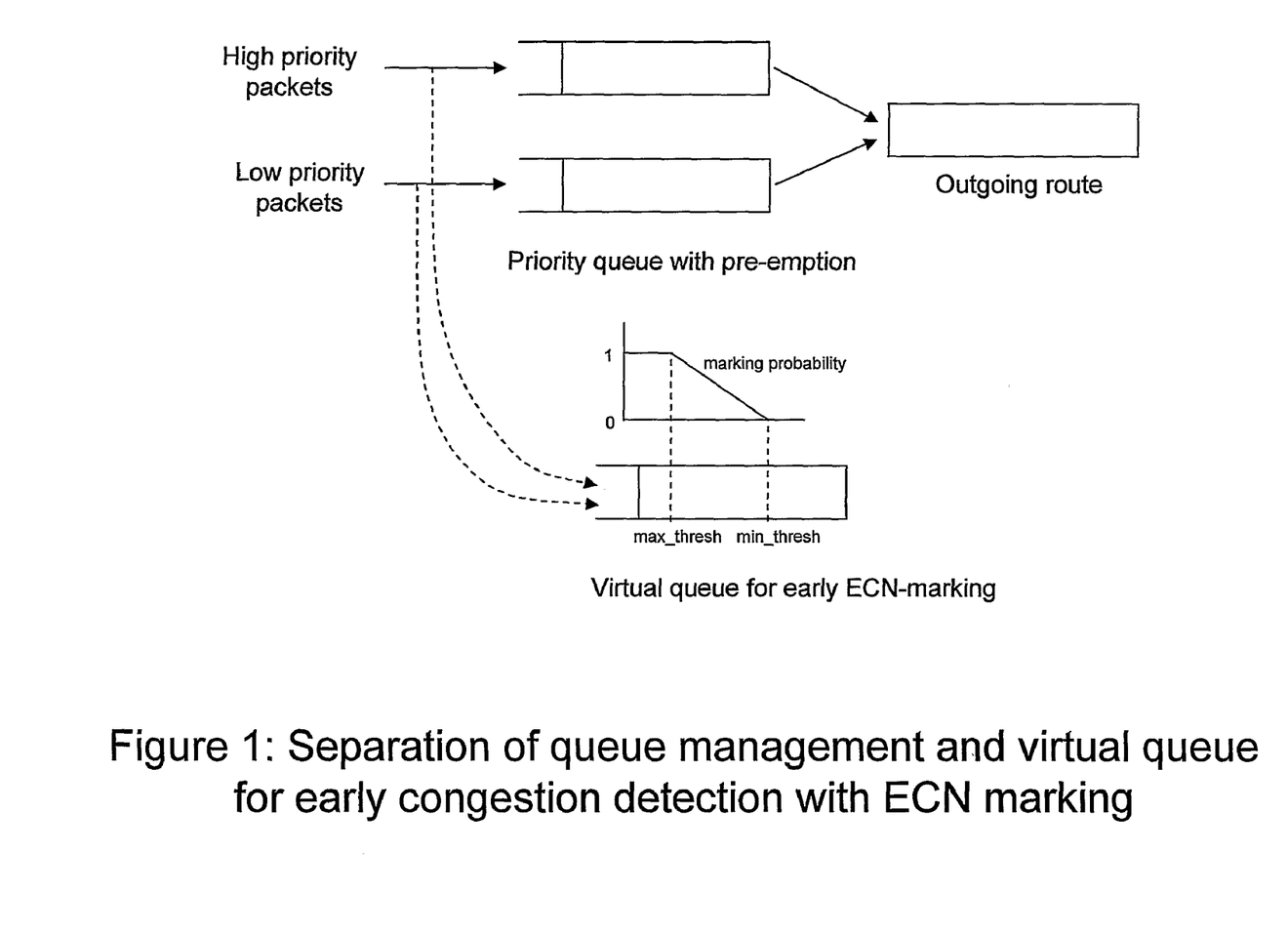
FIG. 1 illustrates the use of a virtual queue for early congestion marking, with priority queueing being used on the output buffer.

A further development of ECN is the use of a virtual queue for early marking [6,9,11]. A virtual queue simply operates as a counter (not a real packet queue). The counter is incremented by the sizes of arriving packets and decremented at a constant rate that is normally slightly lower than the configured rate of the outgoing route. The size of the virtual queue, at the moment that a packet arrives for sending on the outgoing route, is used to determine an appropriate congestion signal such as an ECN mark. ECN marking may be done probabilistically according to the virtual queue size, using for example an algorithm such as Random Early Detection (RED, [12]). Through the use of a virtual queue, emptied at a rate slightly lower than the configured rate, congestion signaling will start when the actual outgoing buffer is still close to empty, thereby ensuring low packet queueing delay and low risk of packet drop. FIG. 1 illustrates the use of a virtual queue for early congestion marking, with priority queueing being used on the output buffer.

One development arising from the M3I project was a form of measurement-based admission control using ECN, which was known as the Guaranteed Service Provider (GSP). In subsequent developments this is known as Guaranteed QoS Synthesis (GQS). With this approach, illustrated in FIG. 2, a region of the network is surrounded by gateway routers which perform admission control for guaranteed service requests on the basis of the measured rate of ECN marking across the inter-gateway path concerned. Routers within the region may use priority queueing, possibly with pre-emption, in order to give precedence to packets in guaranteed flows. In one form of this scheme best-effort packets are also subject to ECN marking, but best-effort flows are assumed to be rate-adaptive in response to ECN marking whereas guaranteed flows do not adapt their rates. (Note: In practice some best-effort flows may not be ECN-capable but will adapt their rates in response to packet drops, and other best-effort flows may not adapt their rates at all). This scheme retains a key element of a market-based solution—there is strong demand for guaranteed service then best-effort traffic is forced to back off (through rate-adaptation to ECN marking) but if there are many best-effort flows then guaranteed service demands may be rejected (admission control). With the use of appropriate pricing and appropriate marking rate thresholds for admission control, this scheme provides a fair market-based solution. However it is likely that network operators might wish to place constraints on market-based resource sharing, for example by ensuring that each traffic class has access to a guaranteed minimum amount of bandwidth regardless of the demand from the other class, and this scheme has not heretofore provided an efficient mechanism for doing this.

The M3I project [9] have put forward a GSP mechanism that was described in more detail by TUD [13]. Earlier work had proposed admission control based on congestion measurements [6], and also proposed the use of virtual queues [6,11].

Several researchers have also investigated schemes for admission control based on load measurements [2,4,5], and there has also been a proposal to base admission control on measurements of delay variation [7].

Referring to prior art patent documents, European application EP 1,317,151 relates to a method for congestion control signaling for use in a wireless network, and includes a brief review of the uses of ECN marks for congestion control signaling.

U.S. Pat. No. 5,751,969 relates to apparatus and methods for predicting and managing congestion in networks.

U.S. Pat. No. 6,657,962 relates to a system for minimising congestion in a communication system.

UK patent application GB 2,281,005 relates to a manner of self-regulating traffic to avoid congestion in an Asynchronous Transfer Mode (ATM) network.

U.S. patent application US 2003/0097461 relates to systems and methods for controlling network demand via congestion pricing, and includes a discussion of ECN-based schemes.

International patent application WO 03/010909 relates to a system and method for traffic congestion control at the media access controller (MAC) level. The media access controller receives an inbound packet and pre-classifies the packet for determining its priority. A utilisation level of a queue associated with the determined priority is analysed for determining its level of congestion. The packet is admitted or not based on the congestion information. Admitted packets are forwarded to the packet switching controller which engages in further classification and congestion control for determining whether the admitted packet is to be forwarded to a destination address. It will be noted that the response of the above system to congestion is to selectively drop packets such that higher priority packets are forwarded at the expense of lower priority packets.

BRIEF SUMMARY

According to a first aspect of the present invention, there is provided a packet forwarding apparatus comprising:
- an input for receiving packets;
- a packet classifier arranged in operation to read a class indication in received packets and in dependence thereon to pass packets to a class-based policer associated with the class indicated;
- a plurality of class-based policers, each class-based policer being operable to assign a provisional indication to packets of said associated class indicative of whether or not a measure of the load presented by packets of said class exceeds a predetermined class-based threshold;
- a multi-class policer operable to receive packets processed by said class-based policers and, in response to congestion arising at said packet forwarding apparatus, to assign a congestion indication in relation to a packet in dependence on whether or not a provisional indication assigned by the associated class-based policer in respect of said packet indicates that the load presented by packets of the associated class exceeds said class-based threshold; and
- an output for presenting packets processed by said multi-class policer for onward transmission from said apparatus.

There is further provided a method of forwarding packets, said method comprising the steps of:
- receiving packets;
- reading a class indication in received packets and in dependence thereon passing packets to a class-based policer associated with the class indicated;
- in each of a plurality of class-based policers, assigning a provisional indication to packets of said associated class in response to a measure of the load presented by packets of said class exceeding a predetermined class-based threshold;
- receiving, in a multi-class policer, provisionally-indicated packets processed by said class-based policers, and assigning a congestion indication to packets having said provisional indication in response to congestion arising at said packet forwarding apparatus; and
- presenting packets processed by said multi-class policer for onward transmission.

According to a related aspect of the invention, there is provided a computer program or suite of programs arranged such that when executed by a computer or collectively by a plurality of computers it/they cause the computer or computers to perform the above method.

According to another related aspect of the invention, there is provided a computer readable storage medium storing a computer program or any one or more of a suite of computer programs as set out in the previous paragraph.

Embodiments of the invention can be thought of as using a form of continuous-rate token bucket in association with a virtual queue to control the relative congestion indication seen by different traffic classes, or according to different service arrangements, in order to ensure that each class can have a minimum bandwidth guarantee within which it receives no congestion indication. The use of leaky and token buckets as a traffic-shaping mechanism is well-known, and has been widely studied (particularly in ATM networks) for policing and shaping packet flows to ensure conformity with specified rate bounds. This concept has not previously been used in the context of virtual queues for early congestion indication.

Embodiments of the invention are able to provide a simple and efficient means of providing minimum bandwidth guarantees within lightweight measurement-based admission control schemes. Previous measurement-based admission control schemes do not have any specific mechanism for ensuring minimum bandwidth availability for different traffic classes. It could be achieved by explicit segregation of capacity at each router, but this approach is inefficient and inflexible.

Rather than using such segregation and simply dropping packets of a particular class in response to packets of that class causing a threshold for that class to be exceeded, preferred embodiments of the invention are able to allow packets in different classes to share overall capacity to a certain extent, even where there is an excess of packets in a particular class, but in the event that an excess of packets in a particular class is causing overall congestion, at least some of the excess of packets may still be forwarded, rather than dropped, but will be forwarded with appropriate congestion indications. This allows routers, senders and receivers to take appropriate action in relation to subsequent traffic, the nature of which may depend on whether the traffic is "best effort" traffic or "guaranteed" traffic".

In order to ensure that overall congestion at the packet forwarding apparatus will not lead to congestion indications being incorrectly, or perhaps "unfairly" assigned to packets of classes currently keeping within their class-based thresholds, the multi-class policer may be arranged to receive packets processed by the class-based policers even if they have not been assigned a provisional indication of excess class-based load, but be arranged not to assign a congestion indication to packets not having a provisional indication of such excess class-based load, irrespective of whether or not the packet forwarding apparatus is currently experiencing overall congestion.

It should be pointed out that according to embodiments of the invention, the concept of packets being "passed", "sent", "received" or "presented" by or within the apparatus, or parts thereof, may not necessarily involve physical movement of any item, but will be understood by those skilled in the art to refer to or include ongoing processing of data packets, and transitions between stages of such processing.

DETAILED DESCRIPTION OF EXEMPLARY EMBODIMENTS

The embodiment of the invention that we describe here is an extension of the virtual queue congestion detection mechanism, and is designed to enable distinct minimum bandwidth guarantees to be provided for each of two or more traffic classes. According to the embodiment, each traffic class has associated with it a corresponding counter which filters packets of that class into what can be thought of as a virtual queue. The counter acts as a form of continuous rate token bucket. If the traffic class has low priority (or equal priority to other classes) then the counter filters out packets of that class up to rate $M(B)$, which is the rate by which the counter is incremented (the token rate).

Specifically, the counter is decremented by the size of each new packet provided that the counter would not then become negative. The packet which thereby receives a token is not then offered to the virtual queue and receives no congestion indication. If the counter would become negative then the counter is not decremented and the packet does not receive a token. The packet is then offered to the virtual queue, and it may receive a congestion indication depending on the size of the virtual queue. The counter is incremented at rate $M(B)$. Note that packets do not queue to receive tokens.

Figure 3:
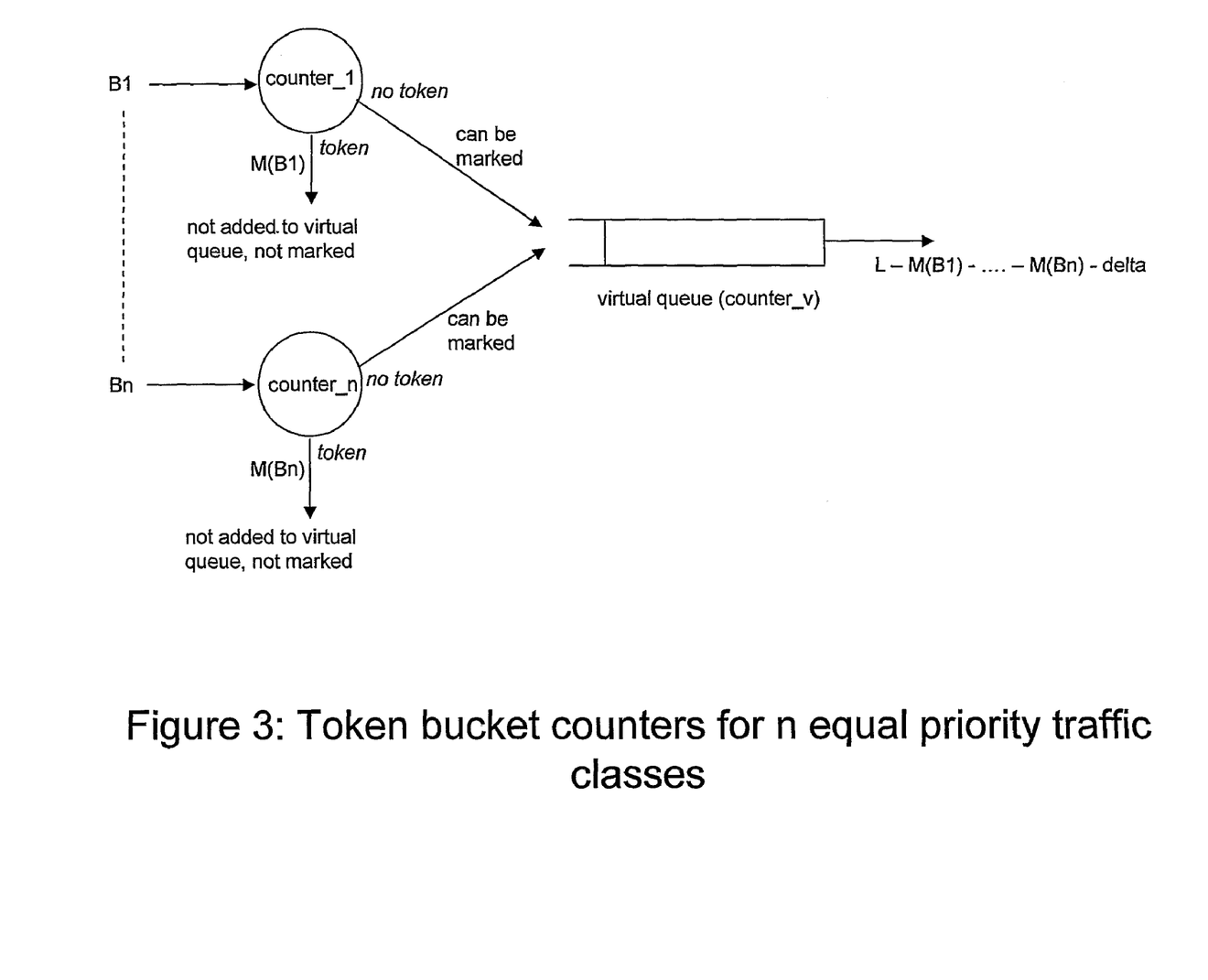
FIG. 3 is a model of a mechanism for providing several equal priority traffic classes by means of several token bucket counters.

This mechanism ensures that the traffic class has access to a minimum bandwidth $M(B)$ without receiving congestion indication. In addition, the output rate of the virtual queue is reduced by $M(B)$, and this ensures that if the total rate of other traffic classes approaches $L-M(B)$ (where L is the configured rate) then the virtual queue will saturate, and those classes exceeding their minimum bandwidth will receive congestion indication. FIG. 3 illustrates this mechanism in the case of an arbitrary number of traffic classes having equal priority. Of course the total guaranteed bandwidth $M(B1)+\ldots+M(Bn)$ should be less than the configured rate L, and the virtual queue rate is reduced by a further small amount delta in order to ensure early marking.

Figure 4:
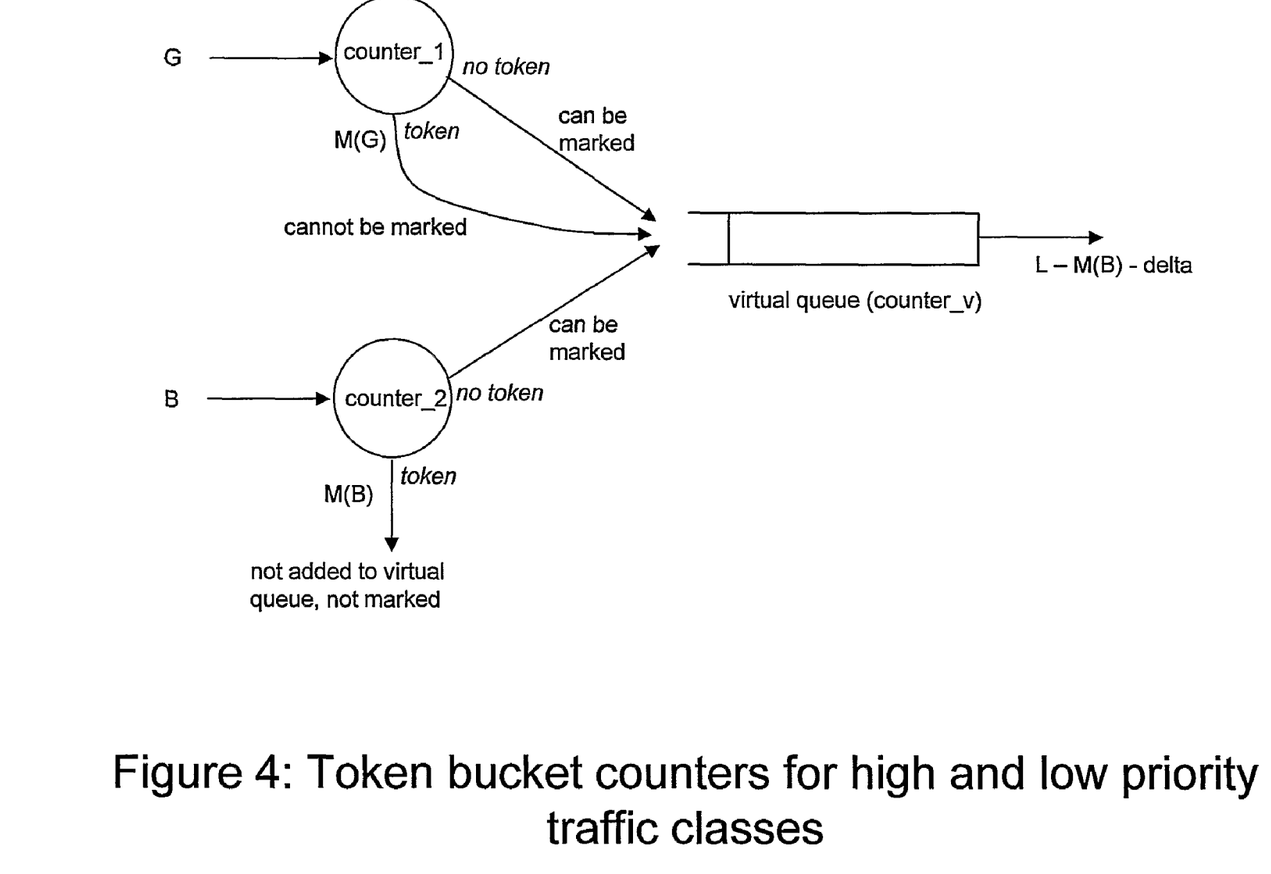
FIG. 4 is a model of a mechanism for providing two traffic classes having different priority levels using token bucket counters, according to an embodiment of the present invention.

Consider now the case where one traffic class G has priority over all other classes through the use of a priority queueing scheme, as in FIG. 1. In the queueing scheme of FIG. 1, high priority packets are sent before low priority packets. Additionally when the queueing space is full newly arriving high priority packets are allowed to pre-empt waiting low priority packets. In this case the low priority traffic can be allowed to share the minimum bandwidth guaranteed for high priority traffic, since the queue management ensures that high priority packets are unaffected by the presence of low priority packets. This is achieved as follows. A counter with token rate $M(G)$ is used to filter high priority packets into the virtual queue. However all high priority packets are offered to the virtual queue whether or not they receive tokens, but those packets which do receive tokens are not allowed to receive any congestion indication. The packets receiving tokens are still added to the virtual queue in order to contribute to the probability of congestion indication seen by other packets. Finally, the virtual queue output rate is not in this case reduced by $M(G)$. This mechanism is illustrated in FIG. 4 for the case of one high priority class G and one low priority class B.

If the virtual queue signals congestion via ECN marking (rather than packet drops) then we assume that the minimum bandwidth guarantees are assured through appropriate traffic reaction to marking. In the case of best-effort traffic, flows should be rate-adaptive in response to ECN marking. In the case of guaranteed traffic, connection admission control should be applied, for example by rejecting new requests when the accumulated end-to-end marking rate exceeds a given threshold.

Figure 2:
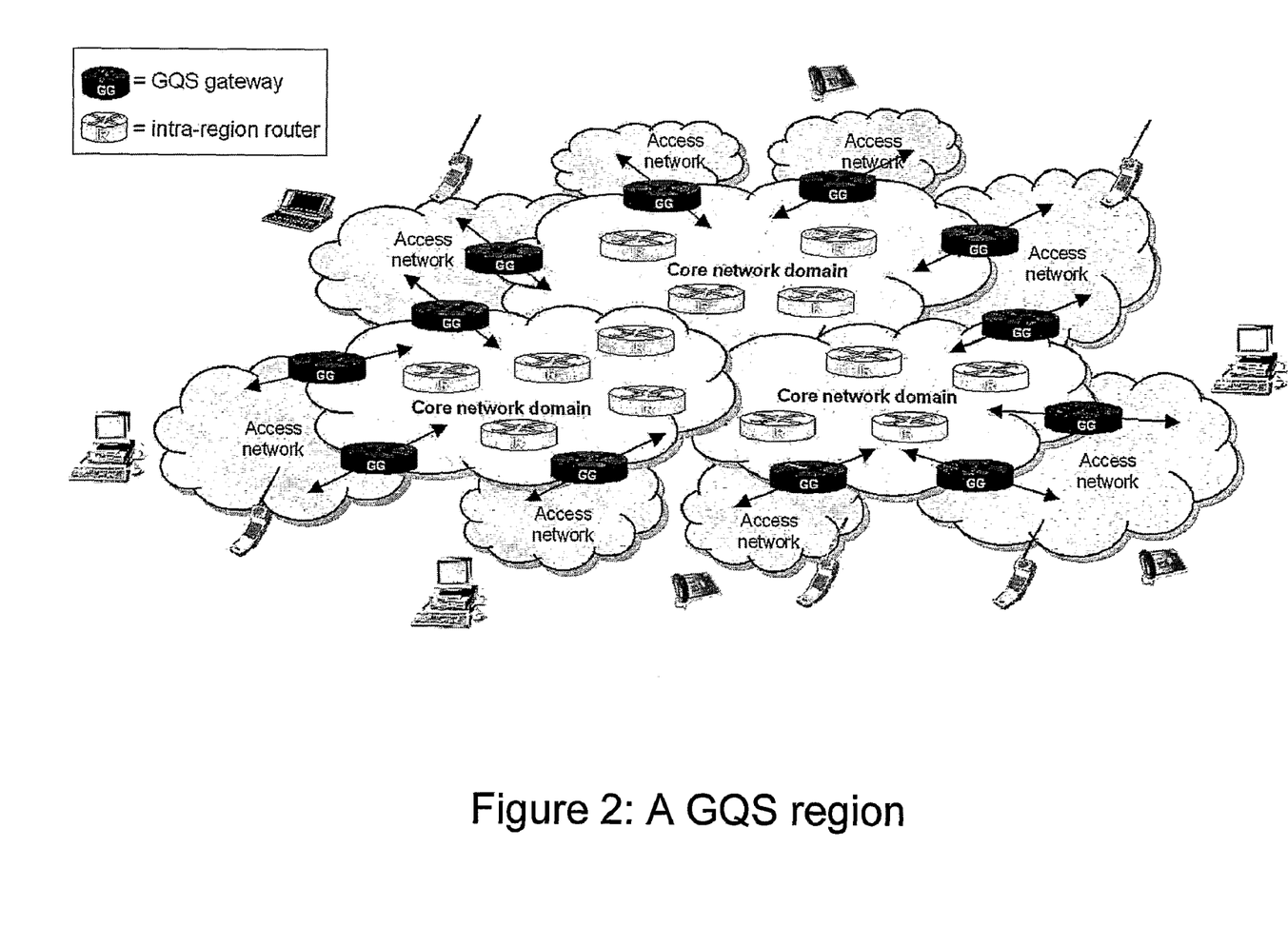
FIG. 2 shows a region of a network surrounded by routers, and illustrates the provision of admission control.

Detailed Description of an Implementation Scenario—One "Guaranteed" Class and One "Best-Effort" Class We consider the GQS scenario illustrated in FIG. 2. Routers within the core GQS region apply ECN marking using a virtual queue, and use priority queueing with pre-emption to give absolute precedence to packets in guaranteed flows, as in FIG. 1. Best-effort flows are rate-adaptive in response to ECN marking. Gateway routers apply admission control to demands for new guaranteed flows on the basis of the measured ECN marking rate on existing guaranteed flows across the relevant inter-gateway path.

Using the simple virtual queue arrangement illustrated in FIG. 1, when there is competition for resources the balance between guaranteed flows and best-effort flows is determined by relative demand (and by the marking rate threshold which triggers admission control, as set by the network operator). An increase in guaranteed demand normally causes best-effort traffic to back-off. However, very strong best-effort demand could result in guaranteed traffic being denied access. In principle it is possible for either class of traffic to completely push out the other class—there is no guaranteed minimum bandwidth for either traffic class.

Figure 5:
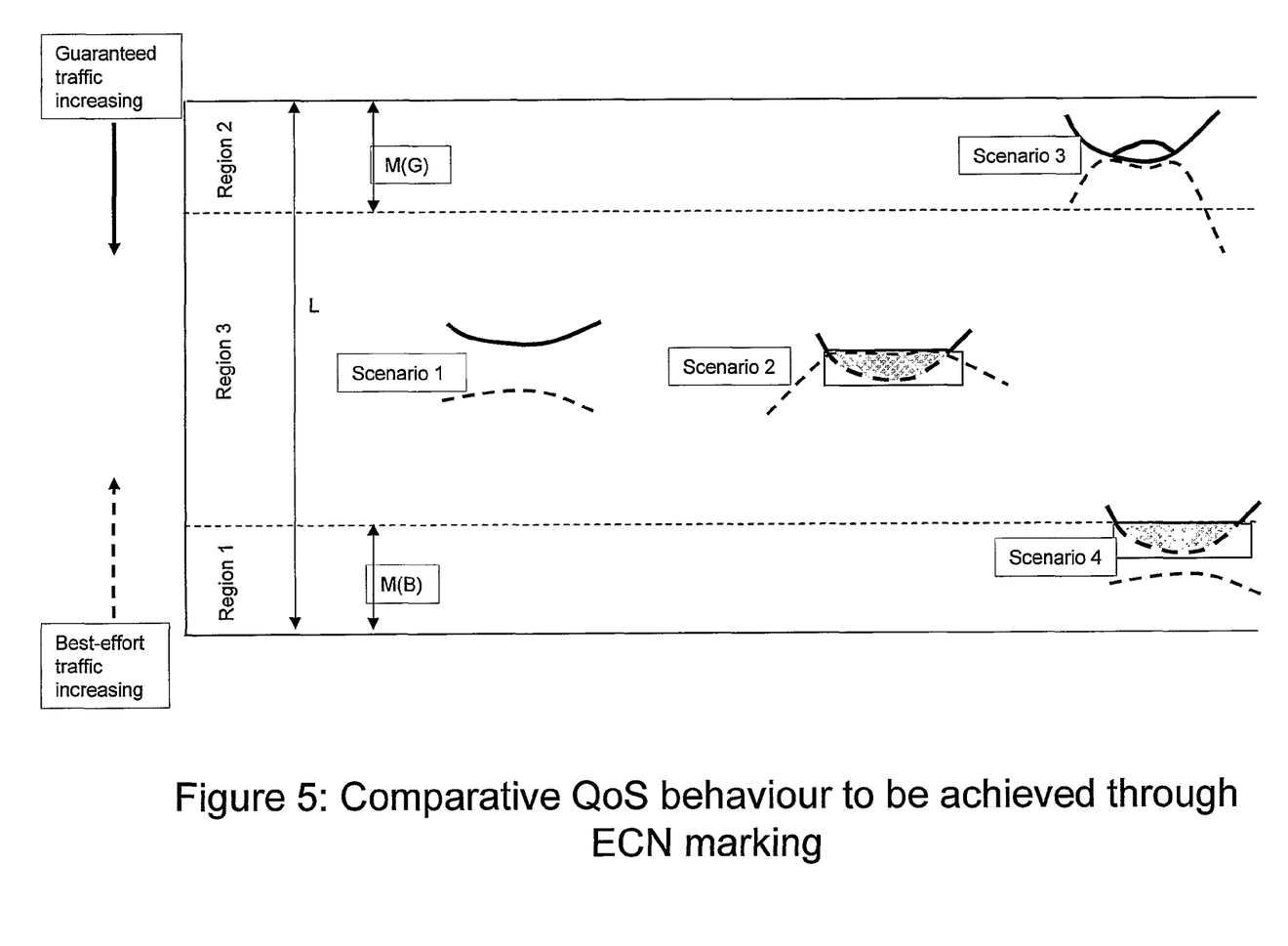
FIG. 5 shows a graph illustrating regions of different relative demand between "Guaranteed" traffic and "Best-Effort" traffic.

The presently described embodiment aims to change the virtual queue marking algorithm in order to achieve the following traffic behaviour. Suppose that G and B are the levels of demand for "Guaranteed" and "Best-Effort" traffic respectively on a route outgoing from a router, and that M(G) and M(B) are the minimum bandwidth levels to be guaranteed for each class. FIG. 5 illustrates regions of different relative demand, with guaranteed traffic demand increasing from the top line downwards and best-effort traffic demand increasing from the bottom line upwards. In region 1, best-effort demand is within its minimum guaranteed level M(B). In region 2, guaranteed traffic demand is within its minimum guaranteed level M(G). In region 3, both traffic classes exceed their minimum bandwidth guaranteed levels. Several different traffic load scenarios are illustrated, in each case the solid line represents guaranteed traffic load and the dashed line represents best-effort traffic load.

The desired behaviour for each scenario is as follows:

Scenario 1: G>M(G) and B>M(B) but no congestion so neither traffic class is constrained.

Scenario 2: G>M(G) and B>M(B) with congestion. Then G may be constrained by admission control and B reduces its rate in response to congestion marking, with a balance that depends on relative demand and on the marking threshold used to trigger admission control.

Scenario 3: G<M(G). No admission control is applied to new guaranteed flows whatever the level of best-effort demand. Best-effort traffic can use any spare capacity not used by guaranteed flows. If there is high best-effort demand then best-effort traffic is forced to back off by high congestion marking. Also, guaranteed packets have precedence over best-effort packets through the use of priority queueing with pre-emption in the outgoing router buffer.

Scenario 4: B<M(B). Best-effort traffic does not receive congestion marking whatever the level of demand from guaranteed traffic. The guaranteed traffic level is constrained through admission control to G<L−M(B), where L is the configured rate of the outgoing link. This is necessary to ensure the minimum bandwidth guarantee for best-effort traffic. The shaded area indicates the guaranteed traffic demand that is rejected by admission control.

This behaviour can be assured by the virtual queue marking mechanism according to the embodiment of the invention, having one token counter for guaranteed traffic and one token counter for best-effort traffic, as follows:

The marking mechanism comprises a virtual queue, whose length determines the probability that a packet is congestion-marked, and two counters which filter the input to the virtual queue (see FIG. 4). Note that the virtual queue is also simply a counter.

Counter_1 is incremented at rate M(G) provided it does not exceed size bucket_1, and is decremented by the size of each arriving G-packet (which thereby receives a token) provided the counter does not become negative. Every G-packet is also offered simultaneously to the virtual queue (counter_v), but those packets which received tokens by counter_1 are not allowed to be marked. This ensures that guaranteed traffic receives no congestion marking if its rate is less than M(G).

Counter_2 is incremented at rate M(B) provided it does not exceed size bucket_2, and is decremented by the size of each arriving B-packet (which thereby receives a token) provided the counter does not become negative. B-packets which do not receive tokens are simultaneously offered to the virtual queue (counter_v) and can be marked. B-packets which receive tokens are not offered to the virtual queue and are not marked. This ensures that best-effort traffic receives no congestion marking if its rate is less than M(B).

The virtual queue (counter_v) is incremented by the size of each G-packet and B-packet offered to it provided the counter does not exceed vq_limit. Any markable packet which is offered to the virtual queue but not added to it (because vq_limit is exceeded) is marked. Also a RED-type marking algorithm is applied whereby markable packets added to the virtual queue are marked probabilistically according to the queue size, e.g. with probability linearly increasing from 0 to 1 as the queue size varies between two thresholds min_thresh and max_thresh.

The virtual queue output rate is set to L−M(B)−delta, where L is the outgoing configured rate and delta is a small margin which ensures early marking.

An example implementation of the mechanism as pseudocode is given below.

Pseudocode

G-Packet Arrival
    counter_1=counter_1+M(G)*(time−last_G_packet_time)
    if counter_1>bucket_1 then counter_1=bucket_1
    last_G_packet_time=time
    if counter_1>packet_size then (counter_1=counter_1−packet_size; packet receives token) else (packet does not receive token)
    offer packet to virtual queue B_Packet Arrival
    counter_2=counter_2+M(B)*(time−last_B_packet_time)
    if counter_2>bucket_2 then counter_2=bucket_2
    last_B_packet_time=time
    if counter_2>packet_size then (counter_2=counter_2−packet_size; packet receives token) else (packet does not receive token; offer packet to virtual queue)

Offer Packet to Virtual Queue
    counter_v=counter_v−(L−M(B)−delta)*(time−last_packet_time)
    if counter_v<0 then counter_v=0
    last_packet_time=time
    if counter_v+packet_size<vq_limit then {counter_v=counter_v+packet_size; if (packet has no token) and RAND<(counter_v−min_thresh)/(max_thresh−min_thresh) then mark packet} else (if packet has no token then mark packet)

An Alternative Scenario for a Two-Class System

Figure 6:
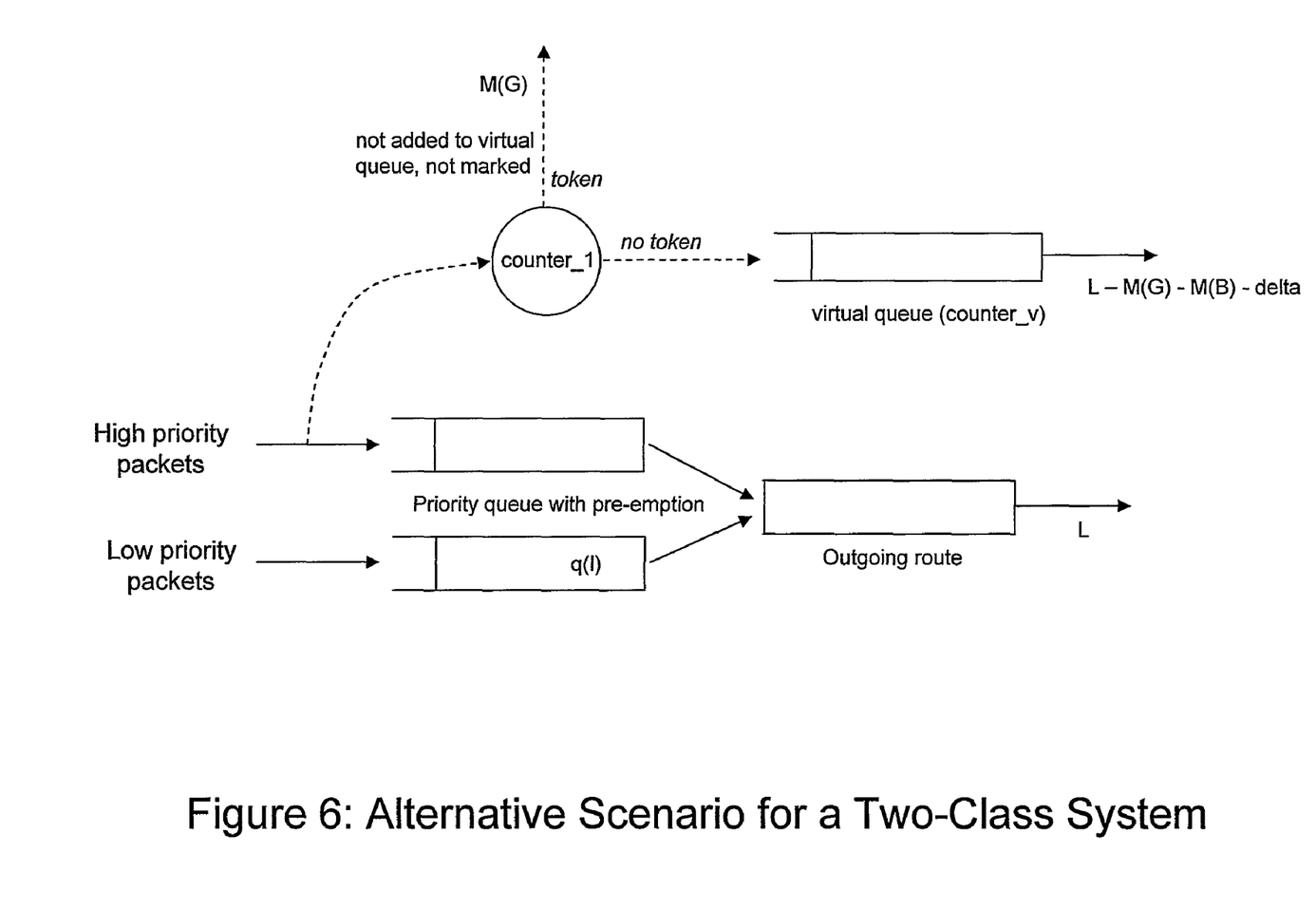
FIG. 6 is a model of an alternative mechanism to that shown in FIG. 4, also for a two-class system

With reference to FIG. 6, an alternative version of a two-class system will be briefly described. This scheme is designed to differentiate the congestion marking probabilities of the two traffic classes in a way that better reflects the impact of each traffic class on the service received by the other class. It differs from the above scenario in that only "High Priority" packets, such as "Guaranteed" packets, are placed in the virtual queue, not "Low Priority" packets, such as best-effort packets, but the marking algorithms are changed accordingly. It is still possible to use the filtering approach to provide minimum bandwidth guarantees.

As shown in FIG. 6, the virtual queue is used only for high priority packets.

Low priority packets are marked according to the size of q(I), the number of low priority packets in the outgoing buffer.

High priority packets are marked according to counter_v+q(I), i.e. the sum of the virtual queue size and the size of the outgoing low priority packet queue.

A minimum bandwidth guarantee M(G) is provided for high priority traffic by use of a token bucket filter with corresponding reduction of M(G) in the virtual queue output rate.

A minimum bandwidth guarantee M(B) is provided for low priority traffic by means of a further reduction of M(B) in the virtual queue output rate.

General Operational Design Issues

The operation of the mechanism assumes that the sum of the minimum bandwidths guaranteed for both traffic classes is substantially less than the configured rate, i.e. M(G)+M(B) <<L. We might instead want to have M(G)+M(B)=L, in which case guaranteed traffic has a guaranteed minimum bandwidth level which it is also not allowed to exceed.

This should be achieved through segregation of capacity rather than through congestion marking.

There are two circumstances where admission control based on congestion measurements may have a difficulty. These circumstances arise when the guaranteed traffic load is high—filling most of the link capacity. The first problem arises when there is a new demand for a guaranteed flow requiring high bandwidth. The second problem arises if guaranteed flows have variable bit-rate, in which case existing flows may increase their rate mid-session and still expect guaranteed service. In both cases the solution normally requires leaving spare capacity beyond the point at which admission control is applied. This can be achieved by using a relatively large value of delta by which the virtual queue output rate is reduced in FIGS. 3 and 4. Preferred embodiments of the invention provide an alternative more efficient solution by which some new guaranteed flows, and existing variable bit-rate flows, are allowed to use some of the minimum bandwidth reserved for best-effort traffic. In scenario 4 of FIG. 5 this means that admission control normally stops guaranteed traffic from using capacity in region 1, but some high-bandwidth flows may be allowed to use some of that capacity when they commence, and variable bit-rate flows might also use some of that capacity when they have high-rate bursts. This does of course mean that best-effort traffic no longer has a firm guarantee of minimum available bandwidth.

REFERENCES

[1] A. S. Tanenbaum, "Computer Networks", Third Edition, pp 379-384, Prentice-Hall, 1996
[2] Sally Floyd, "Comments on measurement-based admissions control for controlled-load services", Technical Report, July 1996, http://www.icir.orq/floyd/papers.html
[3] R. J. Gibbens, F. P. Kelly, and P. B. Key, "A decision-theoretic approach to call admission control in ATM Networks," IEEE J. Select. Areas Commun., vol. 13, no. 6, pp. 1101-1114, Aug. 1995.
[4] S. Jamin, P. B. Danzig, S. J. Shenker, L. Zhang, "A measurement-based admission control algorithm for integrated service packet networks", IEE/ACM Trans. Net., vol. 5, no. 1, February 1997
[5] C. Cetinkaya and E. W. Knightly, "Egress admission control", Infocom 2000
[6] R. J. Gibbens and F. P. Kelly. Distributed connection admission control for a connectionless network. Proc. 16th Intnl. Teletraffic Congress, Edinburgh, 1999
[7] G. Bianchi, F. Borgonovo, A. Capone, L. Fratta, C. Petrioli, "Endpoint admission control with delay variation measurements for QoS in IP networks", ACM Sigcomm Comp. Comm. Review, vol. 32, no. 2, April 2002
[8] R. J. Gibbens and F. P. Kelly, "Resource pricing and the evolution of congestion control", Automatica 35 (1999) 1969-1985
[9] M3I, EU Vth Framework Project IST-1999-11429, http://www.m3i.org
[10] K. K. Ramakrishnan, Sally Floyd, and David Black. The addition of explicit congestion notification (ECN) to IP. Request for comments 3168, Internet Engineering Task Force, September 2001, http://www.ietf.org/rfc/rfc3168.txt
[11] S. Kunniyur and R. Srikant, "Analysis and design of an adaptive virtual queue (avq) algorithm for active queue management," in Proc. ACM SIGCOMM 2001
[12] Sally Floyd and Van Jacobson, Random Early Detection Gateways for Congestion Avoidance, IEEE/ACM Transactions on Networking, Aug. 1993
[13] Martin Karsten and Jens Schmitt, Admission Control based on Packet Marking and Feedback Signaling—Mechanisms, Implementations and Experiments, Submission version for ACM/IEEE Transactions on Networking 20 Sep. 2002
[14] Henderson et al., "Congestion Pricing: Paying Your Way in Communication Networks", IEEE Internet Computing, September/October 2001 pp. 77-81

What is claimed is:
1. Packet forwarding apparatus comprising:
an input for receiving packets;
a packet classifier arranged in operation to read class indications in respect of received packets and, in respect of each of a plurality of received packets, to pass said packet to one of a plurality of class-based policers selected for said packet in dependence on the class indication read in respect of said packet, said class-based policer being associated with the class indicated in respect of said packet;
a plurality of class-based policers, each class-based policer being operable to assign a provisional indication to packets of said associated class indicative of whether or not a measure of the load presented by packets of said class exceeds a predetermined class-based threshold;
a multi-class policer operable to receive packets processed by said class-based policers and, in response to congestion arising at said packet forwarding apparatus, to assign a congestion indication in relation to a packet in dependence on whether or not a provisional indication assigned by the associated class-based policer in respect of said packet indicates that the load presented by packets of the associated class exceeds said class-based threshold; and an output for presenting packets processed by said multi-class policer for onward transmission from said apparatus.

2. Packet forwarding apparatus according to claim 1, wherein said class indications include indications of classes including at least two different classes of service.

3. Packet forwarding apparatus according to claim 2, wherein said classes of service include at least one Guaranteed Traffic class.

4. Packet forwarding apparatus according to claim 3, said apparatus operating in a network comprising means for enabling packets having a class indication indicative of a Guaranteed Traffic class to arrive at the apparatus subject to admission control.

5. Packet forwarding apparatus according to claim 4, wherein said admission control and said predetermined class-based threshold in respect of packets having said class indication indicative of a Guaranteed Traffic class are coordinated such that, irrespective of congestion arising at said packet forwarding apparatus, the load presented by packets of said Guaranteed Traffic class is permitted to reach a level at least equal to said class-based threshold without said packets being assigned a provisional indication indicating that the load presented by packets of the associated class exceeds said class-based threshold.

6. Packet forwarding apparatus according to claim 2, wherein said classes of service include at least one Best-Effort Traffic class.

7. Packet forwarding apparatus according to claim 1, wherein:
   said class-based policers are arranged to assign said provisional indications to packets of their associated class in response to a measure of the load presented by packets of said class exceeding said predetermined class-based threshold; and wherein
   said multi-class policer is arranged to receive provisionally-indicated packets processed by said class-based policers, and to assign a congestion indication to packets having said provisional indication in response to congestion arising at said packet forwarding apparatus.

8. Packet forwarding apparatus according to claim 1, wherein said multi-class policer is operable to receive packets processed by one or more of said class-based policers which have not been assigned a provisional indication, and is arranged not to assign a congestion indication to packets not having said provisional indication irrespective of congestion arising at said packet forwarding apparatus.

9. Packet forwarding apparatus according to claim 1, wherein at least one of said class-based policers is arranged to determine that said measure is exceeding said threshold in dependence on the rate of arrival of packets of said class.

10. Packet forwarding apparatus according to claim 1, wherein at least one of said class-based policers is arranged to determine that said measure is exceeding said threshold in dependence on a measure of the rate of arrival of data in packets of said class.

11. Packet forwarding apparatus according to claim 1, wherein at least one of said class-based policers is arranged to determine that said measure is exceeding said threshold in dependence on the amount of packets of said class awaiting processing by said class-based policer.

12. Packet forwarding apparatus according to claim 1, wherein at least one of said class-based policers is arranged to determine that said measure is exceeding said threshold in dependence on a measure of the amount of data arriving in packets of said class awaiting processing by said class-based policer.

13. Packet forwarding apparatus according to claim 1, wherein said multi-class policer is arranged to determine that congestion has arisen at said apparatus in dependence on the rate of arrival of packets at said apparatus.

14. Packet forwarding apparatus according to claim 1, wherein said multi-class policer is arranged to determine that congestion has arisen at said apparatus in dependence on a measure of the rate of arrival of data at said apparatus.

15. Packet forwarding apparatus according to claim 1, wherein said multi-class policer is arranged to determine that congestion has arisen at said apparatus in dependence on the amount of packets awaiting processing and/or the amount of packets being processed by said apparatus.

16. Packet forwarding apparatus according to claim 1, wherein said multi-class policer is arranged to determine that congestion has arisen at said apparatus in dependence on a measure of the amount of data awaiting processing and/or the amount of data being processed by said apparatus.

17. Packet forwarding apparatus according to claim 1, wherein said output is arranged to present packets for onward transmission substantially at a predetermined rate.

18. A method of forwarding packets, said method comprising:
   receiving packets;
   reading class indications in respect of received packets and, in respect of each of a plurality of received packets, passing said packet to one of a plurality of class-based policers selected for said packet in dependence on the class indication read in respect of said packet, said class-based policer being associated with the class indicated in respect of said packet;
   in each of a plurality of class-based policers, assigning a provisional indication to packets of said associated class indicative of whether or not a measure of the load presented by packets of said class exceeds a predetermined class-based threshold;
   receiving, in a multi-class policer, packets processed by said class-based policers and, in response to congestion arising at said packet forwarding apparatus, assigning a congestion indication in relation to a packet in dependence on whether or not a provisional indication assigned by the associated class-based policer in respect of said packet indicates that the load presented by packets of the associated class exceeds said class-based threshold; and
   presenting packets processed by said multi-class policer for onward transmission.

19. A computer-readable storage medium containing a computer program or suite of programs arranged such that when executed by a computer or collectively by a plurality of computers, it/they cause the computer or computers to perform the method of claim 18.

* * * * *